(12) United States Patent
Smith

(10) Patent No.: US 9,560,134 B1
(45) Date of Patent: Jan. 31, 2017

(54) STORAGE ARRAY SIDE WRITE LOCKING

(75) Inventor: Hubbert Smith, Sandy, UT (US)

(73) Assignee: NETAPP, INC., Sunnyvale, CA (US)

( * ) Notice: Subject to any disclaimer, the term of this patent is extended or adjusted under 35 U.S.C. 154(b) by 948 days.

(21) Appl. No.: 13/534,923

(22) Filed: Jun. 27, 2012

(51) Int. Cl.
*H04L 29/08* (2006.01)
*H04L 12/861* (2013.01)
*G06F 3/06* (2006.01)

(52) U.S. Cl.
CPC ....... *H04L 67/1097* (2013.01); *H04L 49/9094* (2013.01); *G06F 3/067* (2013.01)

(58) Field of Classification Search
CPC .. H04L 67/1097; H04L 49/9094; G06F 3/067; G06F 21/67
USPC ................................... 709/223; 714/218, 42
See application file for complete search history.

(56) References Cited

U.S. PATENT DOCUMENTS

| | | | | |
|---|---|---|---|---|
| 4,858,116 A * | 8/1989 | Gillett, Jr. | ................. | G06F 9/52 711/152 |
| 4,949,239 A * | 8/1990 | Gillett, Jr. | ........... | G06F 13/4217 710/108 |
| 5,068,781 A * | 11/1991 | Gillett, Jr. | ........... | G06F 13/4217 710/108 |
| 5,701,470 A * | 12/1997 | Joy | ........................... | G06F 9/52 707/692 |
| 6,253,273 B1 * | 6/2001 | Blumenau | ................. | G06F 9/52 709/226 |
| 6,816,952 B1 * | 11/2004 | Vartti et al. | .................... | 711/163 |
| 7,043,604 B2 * | 5/2006 | Ogasawara | ........... | G06F 3/0605 711/111 |
| 7,228,384 B2 * | 6/2007 | Mizuno | ..................... | G06F 9/52 370/389 |
| 7,496,574 B2 * | 2/2009 | Walker | ..................... | G06F 9/466 |
| 7,797,275 B2 * | 9/2010 | Lee | ..................... | G06F 12/0804 707/618 |
| 7,831,514 B2 * | 11/2010 | Fujimoto | .............. | G06F 21/105 705/59 |
| 7,877,549 B1 * | 1/2011 | Panwar | .............. | G06F 12/0837 710/200 |
| 8,086,585 B1 * | 12/2011 | Brashers et al. | .............. | 707/705 |
| 8,364,903 B2 * | 1/2013 | Singh | ..................... | G06F 9/526 711/141 |
| 8,560,511 B1 * | 10/2013 | Matthews | ............... | G06F 17/24 707/704 |
| 8,566,446 B2 * | 10/2013 | Cochran | .............. | G06F 3/0614 709/217 |

(Continued)

*Primary Examiner* — Uzma Alam
(74) *Attorney, Agent, or Firm* — Klein, O'Neill & Singh, LLP

(57) ABSTRACT

Systems and methods are described herein that provide storage array side write locking. In embodiments, data is on storage arrays that are shared by a plurality of clients, and the storage array prevents write contentions on the shared data by employing a storage array side write locking strategy that uses a write lock table to determine whether requested data is currently being serviced by one of the plurality of clients. For example, upon receiving a request for data, the storage array checks a lock table to determine whether any of the requested data is currently write locked (which indications current use of the data). If the grains are not write locked, then the data request may be allowed. If the grains are write locked, then the data request may be denied. In embodiments, the storage array takes steps to determine whether write locks have become stale and should be removed.

15 Claims, 5 Drawing Sheets

(56) References Cited

U.S. PATENT DOCUMENTS

| | | | |
|---|---|---|---|
| 9,009,196 B2* | 4/2015 | Ram | G06F 17/30557 707/636 |
| 2004/0006616 A1* | 1/2004 | Quinn et al. | 709/223 |
| 2005/0050401 A1* | 3/2005 | Matsuki | G06F 11/0778 714/42 |
| 2005/0050404 A1* | 3/2005 | Castelli | G06F 11/3409 714/57 |
| 2009/0228748 A1* | 9/2009 | Hagerott et al. | 714/718 |
| 2013/0185270 A1* | 7/2013 | Brower | G06F 17/30362 707/704 |

* cited by examiner

STORAGE ARRAY SIDE WRITE LOCKING

TECHNICAL FIELD

The present invention relates generally to storage systems, and more particularly to storage array side write locking.

BACKGROUND OF THE INVENTION

Shared storage systems involve a shared data storage and multiple computer systems which access the shared data storage, for example servers and/or computers (collectively called clients). Large scale storage systems operate with hundreds and/or thousands of clients, which share access to a shared data store comprising many storage arrays, wherein the shared data store is capable of storing many terabytes of data. Traditionally, a storage array is used to store large amounts of data on a large group of storage media (e.g. hard disk drives (HDD), solid state drives (SSD), and the like).

In a shared storage system, because multiple clients (e.g. servers) share the same data, circumstances arise wherein two different servers attempt to access the same data during the same unit of time. Such a circumstance leads to write contentions, wherein one server may overwrite data that another server is using. Such an overwrite causes data inconsistencies and should be avoided. As such, in order to prevent write contentions, traditional systems employ client based write locking methods.

Traditionally, shared storage systems implement a distributed, server-side write locking scheme, wherein the servers are the above described clients. In server-side write locking, a server may access a grain, which is a set of data records. The granularity describes the size of the grain, and the granularity of the name space may be static or dynamically sized. When a server accesses the grain, the accessing server locks the grain by communicating its use of the grain with the other servers in the cluster. Then, when the accessing server is finished with the grain, the accessing server unlocks the grain by communicating its release of the grain's write lock with the other servers in the cluster. For example, if accessing server accesses grain A, accessing server communicates with all other servers in the system to inform the other servers that grain A is write locked, and thus, the other servers are not allowed access grain A. As a result, all the other servers often have logic disallowing access to grain A, and all servers are often capable of receiving and processing high speed signaling from the accessing server to provide notice that grain A is available for use again. Likewise, the same steps are followed by a different accessing server using a different grain (e.g. grain N). As such, the above described write locking method is distributed among the servers in the cluster and the write locking is handled on the server-side.

Traditionally, distributed server-side write locking presents several problems. For example, each server is responsible for locking the data it accesses, which means that all of the servers must constantly communicate with each other in order to keep the write locks up to date. As a result, if any of the servers become noncommunicative for any amount of time and/or for any reason the distributed server-side write locking method becomes unreliable.

For example, if server A access grain A and sends a communication to the other servers that grain A is write locked, then server A will believe that the grain is properly locked and begin operations using the data in grain A. However, if server B does not receive the write lock communication for any number of reasons (e.g. communications malfunction, data corruption, temporary loss of power, etc.), server B may not be aware of the write lock. As such, server B may unwittingly access grain A and overwrite the data therein while server A is performing operations on the same data. As a result, due to a communication error between server A and server B, a write contention may occur.

In another example of traditional methods, server A access grain A and sends a communication to the other servers that grain A is write locked. As a result, the other servers will not access grain A because they believe it to be write locked. Then, while grain A is write locked, server A goes offline for any number of reasons (e.g. loss of power, data corruption, communications malfunction, etc.). As a result, server A may be unable to communicate a release to unlock grain A for minutes, hours, days, etc., thereby causing grain A to be unnecessarily inaccessible to the other servers for an unacceptable amount of time. Because distributed server-side write locking depends on the operability of so many different servers and their communication paths, distributes server-side write locking is vulnerable to a large number of malfunctions originating from a large number of sources.

In order to decrease the number of sources which may cause a write locking breakdown, other traditional methods centralize the write locking operations to a dedicated server. A single server-side write locking system, sometimes called a metadata manager system, controls write locking with a dedicated server; thus, each server request for a grain (e.g. grain A) is funneled through the dedicated write locking server and if the write locking server identifies grain A as unlocked, then the write locking server allows access to the grain A, which is stored on a remotely located storage array. Likewise, if the write locking server determines that grain A is locked, then access to grain A is denied.

While this traditional method may minimize the number of vulnerable nodes within the write locking method, the dedicated server-side scheme is limited in scalability. For example, a dedicated server is limited in the number of requests it can process at any one time. As such, the more data requesting servers which are added to the cluster and need access to the shared data store, the more bottlenecks occur at the dedicated write locking server. Eventually, as more and more data accessing servers and more and more storage arrays are added to the cluster, the dedicated server will be unable to service all the data requests for the grains in the cluster open for write access and the write locking method will become unable to keep up with the volume of write locking requests and cluster operations will break down. As such, single server-side write locking systems are limited in scalability to about a dozen data accessing servers and a couple storage arrays.

In response to the bottleneck problem described above, alternative traditional approaches have extended the dedicated server-side write locking method to multiple dedicated servers. However, as the number of dedicated write locking servers grow, the number of vulnerable points within the system grows as well, as described in the distributed server-side locking method above. As such, if any one of the dedicated write locking server goes offline for any reason or any one of the communications between the dedicated write locking servers is lost for any reason, then the write locking method breaks down as described above in the distributed server-side locking method.

BRIEF SUMMARY OF THE INVENTION

The present invention is directed to systems and methods that provide storage array side write locking. The write locking is executed locally on a storage array that is storing the data being locked. Embodiments of the invention also apply to multiple storage arrays, each storage array managing write locking for grains stored locally on that storage array. A storage array comprises of a plurality of storage media (e.g. several hard disk drives, solid state drives, and/or both). In example embodiments, the data stored on the storage arrays is shared by a plurality of clients, which communicate with the storage arrays to gain access to the data therein. An exemplary embodiment organizes the data stored on one or more storage arrays into name spaces and grains, such that a client desiring a particular data record (for example to perform a write task) can identify the data record's location within the plurality of storage arrays using the data record's name space and grain identification.

In example storage array side write locking systems and methods, the storage array comprises a write lock table where data grains are stored. In embodiments, the write lock table identifies each grain stored in the storage array in a grain identification field. In some example lock tables, the table also includes a lock mode field that dynamically identifies whether a particular grain is currently locked or currently unlocked, and may include fields that associate a locked grain with the client currently using the grain and/or a time stamp indicating the time the current write lock was established.

As stated above, in examples, a storage array receives a request from a client that desires access to one or more grains stored therein, for example to perform a write task to the grain, which writes data to the grain. Upon receiving the request, the storage array may take steps to determine whether to grant the client's request or deny the client's request. In making the determination, the storage array may check the lock table to determine whether any of the requested grains are currently write locked. If the storage array lock table indicates grains are not write locked, then in embodiments, the storage array write locks the grains in association with the requesting client and grants the client access to the grains. Then, after the client completes its operations on the grains, the client releases write access to the grains, the storage array then releases write locks on the grains by updating the lock table. Once the grains are unlocked, those previously locked grains are now unlocked and available to service other client write requests.

In some examples, when the storage array is determining whether to grant a client access to particular grains, the storage array may check the lock table and determine that the grains are write locked in association with a different client. In such a case, in order to prevent a write contention, the storage array may deny the requesting client's request for write access of the write locked grains. While the client may be denied write access to the requested grain, the storage array may allow the client read access to the grain. In embodiments, if the client's requesting message requests access to multiple grains wherein some of the requested grains are write locked and some of the requested grains are unlocked, then the storage array may issue a selective grant to the subset of grains which are not write-locked from a previous operation, wherein the requesting client is granted access to the unlocked grains but denied access to the grains that have a pre-existing write lock in association with a different client.

In some embodiments, when the storage array determines that some (or all) of the requested grains are write locked in association with a different client, the storage array may take steps to determine whether one or more of the write locks are stale; meaning the lock table indicates grain is locked, but the client no longer requires write access. Determining whether a write lock is stale may be based on a time stamp field in the lock table, which identifies when each particular write lock was established. If the storage array determines that the write locks are stale, the storage array may release the write locks associated with the other previous client, write lock the grains in association with current requesting client, and then grant the requesting client access to the grains. Alternatively, the storage array may first query the other client, to determine whether the other client is still using the grains and/or determine whether the other client has become noncommunicative or gone offline. In such an example, the storage array includes logic to make a determination regarding releasing the potentially stale write lock at least in part on a response (or lack of response) from the other client.

Embodiments of the invention differ from typical Network Attached Storage (NAS) systems, in the sense that NAS systems hold and manage a filesystem, which is configured to be permanently attached (e.g. NFS mounted) to a single client. Embodiments of the invention differ with the capability to dynamically and selectively provide write-access to a selection of grains for the duration of the clients write task, without risk of write-contention or overwrite by other clients, then release the data for use by other clients, without human intervention.

Embodiments of the invention differ from typical Cluster DataBase systems, in the sense that Clustered Database systems use server-side (not storage array side) database record locking to dynamically allow exclusive write access to a selection of database records for the duration of the clients write task, then release the data for use by other clients. Embodiments of the invention differ with the logic and methods for the storage array (rather than servers) to dynamically attach a selection of grains for the duration of the clients write task, then release the data for use by other clients, without human intervention.

In short, systems and methods of the present invention provide storage array side write locking. By dynamically controlling write locking locally at the storage array that stores the requested data, many of the problems discussed above in the "background of the invention" are resolved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
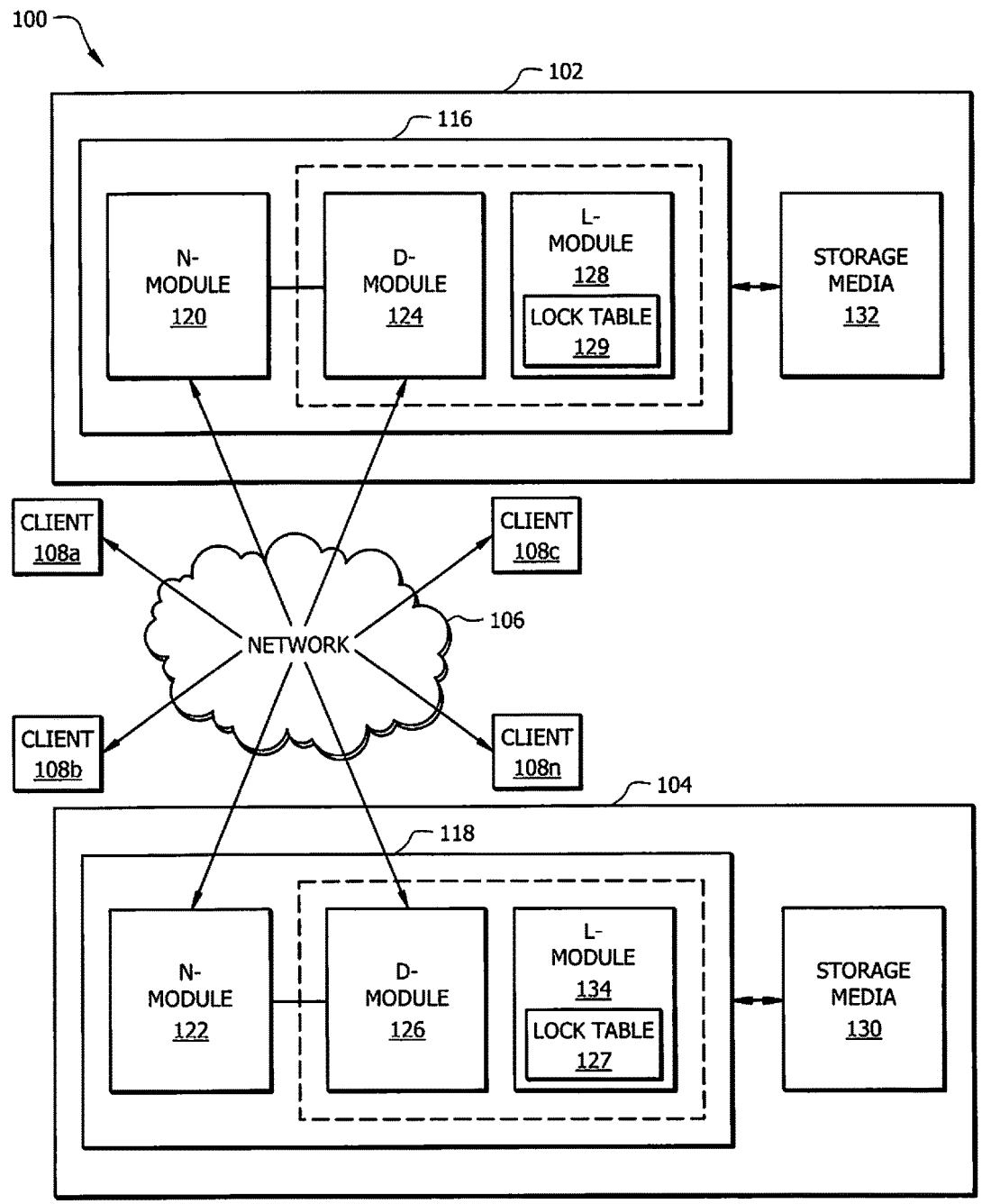
FIG. 1 is an example embodiment of cluster computer system comprising storage arrays which provide storage array side write locking.

FIG. 1 shows a block diagram of a system adapted to provide storage array side write locking in a cluster computer system. System 100 of FIG. 1 comprises an exemplary clustered network environment in which one or more data storage arrays 102 and 104 are coupled to network 106. In embodiments, any number of storage arrays may be included in system 100. Storage arrays 102 and 104 of illustrated embodiments may comprise one or more modules, components, etc. operable to provide operation as described herein. For example, storage arrays 102 and 104 of the illustrated embodiment comprise storage controllers 116 and 118 and a plurality of storage media 132 and 130, respectively. It should be appreciated that storage controllers and/or storage media of storage arrays 102 and 104 may themselves comprise one or more modules, components, etc. In the illustrated embodiment, storage controller 116 is comprised of a network module 120 (referred to herein as "N-Module"), data module 124 (referred to herein as "D-Module"), and locking module (referred to herein as "L-Module") 128. An L-Module is code running on a processor of a storage array. In an alternative storage array embodiment, storage controller 118 comprises N-Module 122 and D-Module 126, and the functions of the L-Module are incorporated into D-Module 126. Storage media 132 and 130 of the illustrated embodiment comprise a plurality of storage media (e.g. disks, hard disk drives (HDD), solid state drives (SSD), flash storage devices, and/or hybrid aggregate combinations, and the like).

The modules, components, etc. of storage array 102 and 104 may comprise various configurations suitable for providing operation as described herein. For example, nodes 116 and 118 may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Storage media 132 and 130 may, for example, comprise disk memory, flash memory, optical memory, and/or other suitable computer readable media. L-module 128 and D-modules 124 and 130 of nodes 116 and 118 may be adapted to communicate with storage media 128 and 130 according to a storage area network (SAN) protocol (e.g., small computer system interface (SCSI), fiber channel protocol (FCP), INFINIBAND, iSCSI, SAS, SATA, USB and similar computer protocols, physical or wireless connections, and the like) and thus data storage media 132 and 130 may appear as locally attached resources to the operating system. That is, as seen from an operating system on nodes 116 and 118, storage media 132 and 130 may appear as locally attached to the operating system. In this manner, nodes 116 and 118 may access data blocks through the operating system, rather than expressly requesting abstract files.

N-modules 120 and 122 may be configured to allow client systems 108a, 108b, 108c, and 108n to communicate with nodes 116 and 118 over network 106, to allow the clients to access data stored in storage arrays 102 and 104. Any number of client systems may be included in the storage system. Moreover, N-modules 120 and 122 may provide connections with one or more other components of system 100, such as through network 106. For example, network module 120 of node 116 may access storage media 130 via communication via network 106 and D-module 126 of node 118. The foregoing operation provides a distributed storage system configuration for system 100.

Clients 108a-108n of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. Clients 108a-108n may be servers with server applications running thereon. The servers may provide file services and/or other services to other client systems (e.g. end user systems not shown).

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections or, alternatively, network connections may be provided by network infrastructure separate from network 106, wherein such separate network infrastructure may itself comprise a SAN, the Internet, the PSTN, a LAN, a MAN, a WAN, a wireless network, and/or the like.

As can be appreciated from the foregoing, system 100 provides a data storage system in which various digital data, analog data, and/or other data may be created, maintained, modified, and accessed (referred to collectively as data management). A logical mapping scheme providing logical data block mapping information, stored within and stored without the data structures, may be utilized by system 100 in providing such data management. For example, a filesystem implemented by storage arrays 102 and 104 may implement a logical technique such as name spaces and grains. As explained above, the granularity of the name space may be static or dynamically sized.

In the exemplary configuration of system 100, clients 108a-108n utilize storage arrays 102 and 104 to store and retrieve data from storage media 132 and 130. In such an embodiment, for example, client 108a can send a request to access data packets to N-module 120 in node 116 within storage array 102. Client 108 can also create and store new data grains to storage array 104 through N-module 122, resulting in new corresponding entries in a lock table 129 of the storage array where the new data grains are stored. In this example, client 108a can use any of the storage arrays in the storage system, to store and/or retrieve data, using network connection 106.

When storing data grains on one or more storage array, the data may be stored and mapped throughout the plurality of storage media. An embodiment maps data on the storage arrays using name spaces and granularity. A name space is an abstract container created to direct clients to hold a logical grouping of unique identifiers located on the storage arrays where the data grains are stored. The storage capacity of a name space may be very large and could include many terabytes of data. The unique identifiers identify grains, which are chunks of data records, and the size of a particular grain is called the grain's granularity. For example, a name space with 64 megabyte granularity comprises grains of no more than 64 megabytes. A set of data records which are locked or unlocked is called a grain, and the size of a grain may be dynamically or statically sized according to system requirements, system parameters and/or user preferences. L-module 128 may be configured to control the locking and unlocking of data grains stored in storage media 132. Further, L-module 128 may be operational to dynamically change the size of the grains based on system parameters, for example, system traffic, write locking traffic, the time of day, the day of year, or the like (e.g. for the purpose of managing active locks and managing stale locks). Alternatively, the grain size may be static and set to a certain byte size (e.g. 64 megabytes).

L-modules 128 and 134 may comprise of lock tables 129 and 127, respectively, for use in controlling the locking and unlocking of grains. In an alternative configuration, D-module 124 is operable to provide the functions of L-module 128 described herein (as shown by the dotted lines in FIG. 1). In such an embodiment, storage array D-module 124 may include lock table 129. Lock table 129 may include fields such as a grain identification field and a lock mode field. In embodiments, the lock table may also include an associated server field and/or a time stamp field. Some of the fields may be omitted if desired, and more fields may be added if desired.

TABLE 1

Example Lock Table

| Grain No. | Lock Mode | Associated Client | Time Stamp |
|---|---|---|---|
| 1 | Locked | Client 108a | 11:25.06 |
| 2 | Locked | Client 108a | 11:25.06 |
| 3 | Locked | Client 108a | 11:25.06 |
| 4 | Locked | Client 108a | 11:25.06 |
| 5 | Locked | Client 108a | 11:25.06 |
| 6 | Locked | Client 108b | 11:42.13 |
| 7 | Locked | Client 108b | 11:42.13 |
| 8 | Not Locked | | |
| N | Not Locked | | |

In one embodiment, lock tables 127 and 129 include a field for each grain stored in storage array 102 and 104, respectively. By populating the table with all of the grains stored in the associated storage array, the lock table remains the same size and the L-module simply updates the fields as needed (e.g. lock mode, associated server, and/or time stamp) rather than constantly creating and deleting entire rows of the lock table. Other embodiments may not populate the table with all of the grains stored in the associated storage array, which may result in less storage space being dedicated to the lock table, but may suffer from performance degradation. The grain identification field may identify the field by any means understandable to a processor, for example by number.

In exemplary embodiments, lock tables 127 and 129 include a lock mode field. In the lock mode field, L-module 128 identifies whether the grain is write locked or not write locked. When a grain is being utilized by a client (e.g. a server), L-module 128 updates the lock mode field of that grain to show that the grain is locked. When the L-module determines that the grain is no longer being used (or not likely being used any longer), then L-module 128 updates the lock mode field to indicate the grain is not locked. Lock tables 127 and 129 may also include an associated client field. For example, if a grain is locked, the associated client field may indicate which client of the plurality of clients in the cluster is currently using the grain. Further, lock tables 127 and 129 may comprise a time stamp field indicating the time that the current lock was established. As will be explained below, the time stamp may be used to determine whether a write lock has timed out (e.g. become stale) or whether the associates client should be queried regarding the use of one or more grains.

FIGS. 2-5 show example methods of storage array side write locking data in a cluster storage system. In exemplary embodiments, before requesting data from a storage array, a client and/or the storage array determines which particular data record (or records) the client desires. Because the data is distributed among a plurality of storage arrays, once the particular desired data record is identified, the client and/or the storage array determines the location of the data record using the data's name space and grain identification. The data's name space narrows the location of the data record to one or more storage arrays, and the grain identification identifies the location of the data record within the identified one or more storage disk. As such, using the name space and grain identification of the desired data record, the client determines to which storage array (or storage arrays) the client should send its data request.

To make the examples shown in FIGS. 2-5 easier to follow, it will be assumed that the client determined that a single storage array system is storing the desired data records (e.g. storage array 102). However, it will be clear to one of ordinary skill in the art, that if the desired data records were stored on more than one storage array, the following steps would be implemented on each of the storage arrays storing an identified portion of the desired data records, such that all of the desired data records would be retrieved upon availability.

Figure 2:
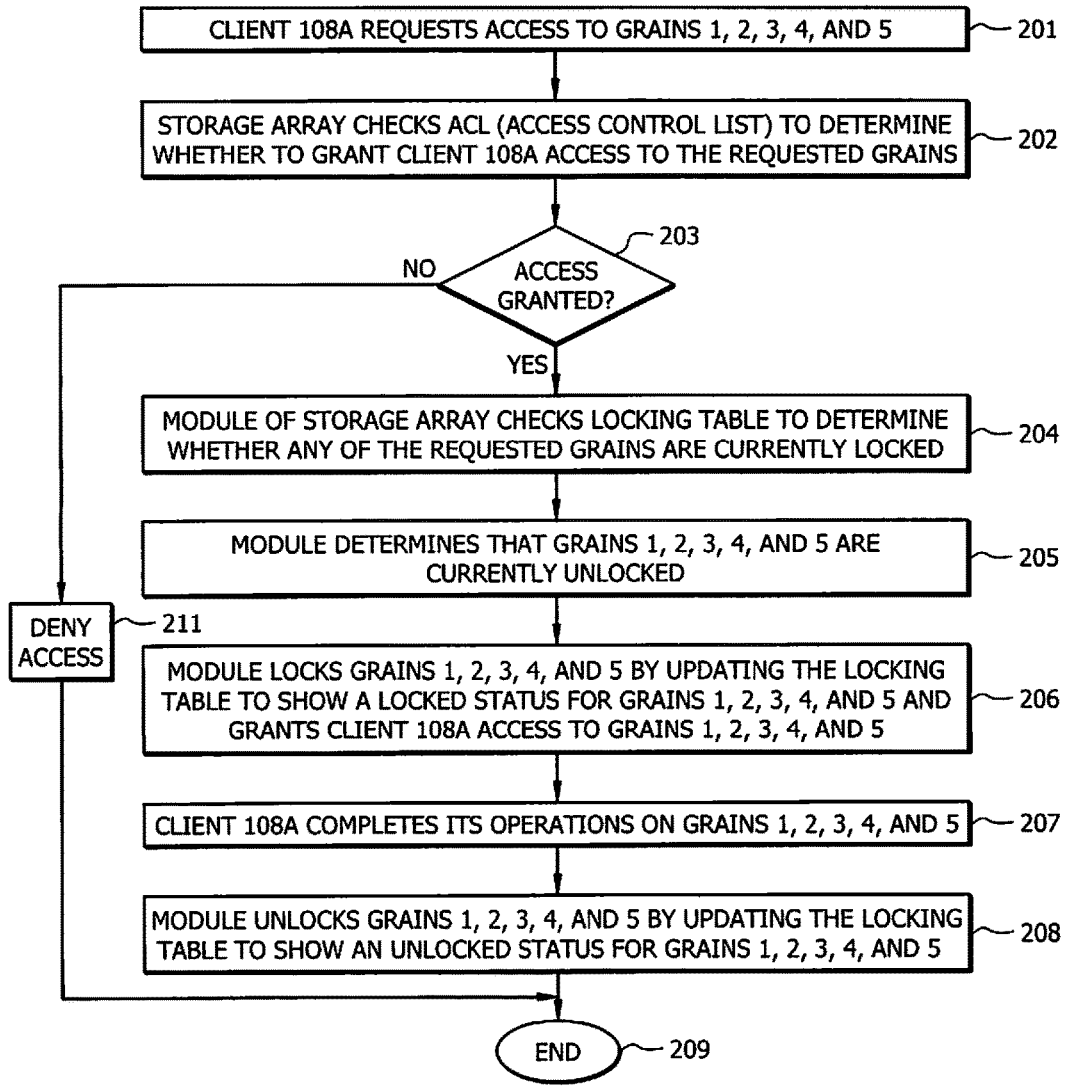
FIG. 2 is an example method of storage array side write locking.

In FIG. 2 the example method performs storage array side write locking of data in response to a client requesting and being granted access to data records located in plurality of different grains. In step 201, client 108a sends request to storage array 102 requesting access to data. In this example request, client 108a is requesting data that is located within grains 1, 2, 3, 4, and 5, and the request identifies grains 1-5 in the request. Alternatively, the request may identify the data records which are desired and the storage array 102 may determine which grains (e.g. grains 1-5) include the requested data records.

In optional step 202, storage array 102 checks an access control list (ACL) to determine whether client 108a should be given access to storage array 102 as a whole. Step 202 is optional and may be enabled when security features on storage array 102 are enabled. When checking the ACL, the storage array determines whether client 108a is identified on the ACL as authorized to access any of the data stored therein.

In step 203, the storage array either grants or denies client 108a's access to storage array 102 as a whole. If access to storage array 102 is denied, an error message may be sent to client 108a (step 211). In step 209, having denied access to client 108a, the task ends.

If in step 203, client 108a is granted access to storage array 102, L-module may determine whether the request is a write access request or a read access request (step not shown). If the request is a read access request, then L-module may optionally allow access to the requested grains without checking lock table 129 because there is no danger of a writing contention when the client is reading the grain. If the request is a write request, L-module 128 of data store array 102 checks the lock table 129 to determine whether access to the specifically requested grains should be granted. As described above, lock table may include some or all of the following fields: a grain identification field, a lock mode field, an associated client field, and a time stamp field. When L-module 128 checks the lock table, finds the entry for the requested grains and determines from the information therein whether the grains are currently write locked. For example, in client 108a's request, client 108a requested access to grains 1-5. In step 204, L-module 128 accesses the lock table and looks up grains 1-5. In step 205, the operating system determines the lock mode associated with grains 1-5 and determines that grains 1-5 are currently unlocked. Because the grains are currently unlocked, they are available for access. As such, in step 206, L-module 128 locks grains 1-5 by updating their lock mode entries in the lock table to locked. While updating the table entries associated with grains 1-5, L-module may also update the grains' associated client field by indicating that the grains are locked in association with requesting client 108a. Further, L-module may update the grains' time stamp field by inputting a time stamp indicating the time that each respective grain was locked.

In step 206, L-module also grants client 108a access to the grains. With access to the grains, client 108a is free to read, write, or otherwise manipulate any or all of the data in grains 1-5 without worrying about write contentions. In step 207, client 108a has completed its operations on all or some of grains 1-5 and indicates as such to storage array 102. For example, as client 108a completes its operations on one or more of grains 1-5, indications of each respective completion can be received by storage array 102. As such, subsets of the grains may be unlocked as operations on them are individually completed. Alternatively, client 108a can wait until it has completed all its operations on all of grains 1-5 before indicating the completion of its operations. In some embodiments, client 108a may not send an indication that operations are complete to storage array 102. In such embodiments, to dismiss stale locks, storage array 102 may apply logic, such as client heartbeat and/or a query from the array to the client via application programmers interface (API).

In step 207, L-module unlocks the grains which are indicated as no longer being used in operations. In this example, client 108a indicated that the operations on grains 1-5 were complete, so the operating system unlocks grains 1-5 by updating their respective lock mode entries in the lock table to unlocked. Alternatively, if client 108a indicates that operations on grains 1-2 are complete but receives no indication that operations on grains 3-5 are complete, then storage array could unlock grains 1-2, while leaving grains 3-5 locked until storage array 102 receives an indication that grains 3-5 are ready to be unlocked. Upon storage array 102 receiving an indication that grains 3-5 are ready to be unlocked, storage array 102 unlocks grains 3-5, for example by updating the lock table. If desired, the operating system can clear the associated client field and the time stamp field because they are no longer applicable to the respective grains. In step 209, the operation is complete and the task ends.

Figure 3:
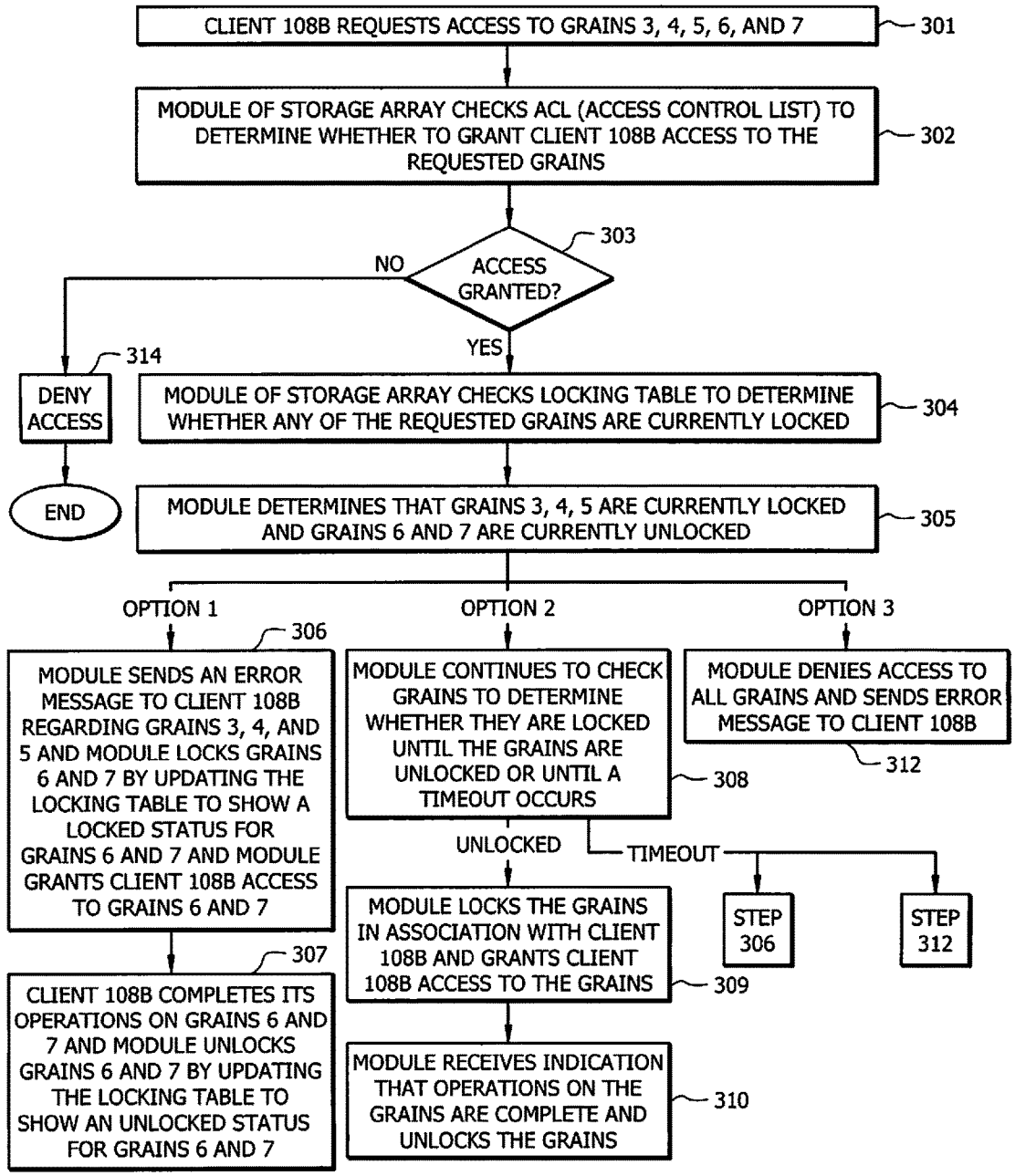
FIG. 3 illustrates an example where a client requests grains which are currently storage array side write locked.

FIG. 3 illustrates an example where a client requests grains which are currently storage array side write locked. In step 301 of this example, client 108b sends a request to storage array 102 requesting access to grains 3, 4, 5, 6, and 7. In step 302, storage array 102 checks the ACL (access control list) to determine whether client 108b should be permitted access to storage array 102. If client 108b is not listed as having access to storage array 102, or is otherwise unauthorized to access storage array 102, then in step 314, access is denied, an error message is sent to client 108b, and the task ends.

If however, in step 303, storage array 102 determines that client 108b is authorized to access storage array 102, then client 108b is granted access to storage array 102. In step 304, L-module 128 identifies which grains are requested in the received request and determines whether or not the requested grains are locked. In determining whether the requested grains are locked, L-module checks the data entries in lock table 129 for each requested grain. In this example, when checking the data entries for each requested grain, L-module 128 determines that grains 3-5 are currently locked in association with client 108a and grains 6-7 are currently unlocked. As such, in this example, some of the requested grains are locked and thereby inaccessible and some of the requested grains are unlocked and therefore accessible. There are several ways to handle a partial locked situation, as in this example, and FIG. 3 shows three example options; however, the system is not limited to the three options shown in FIG. 3. Which option (e.g. options 1-3) is used may be determined by storage array 102 or by the client. The option selection may be dynamically determined and may be based on storage array parameters, cluster storage system parameters, and/or client parameters. Alternatively, the system may be configured to select the same option each time.

In example option 1, the example method moves to step 306 where L-module gives client 108b a partial grant, allowing access to some of the requested grains while denying access to the others of the requested grains. In step 306, because grains 6-7 are currently unlocked and available for access, L-module locks grains 6-7 in association with client 108b by updating the lock table as explained above. Because grains 3-5 are already locked in association with a different client (e.g. client 108a), L-module leaves the data entries associated with grains 3-5 alone. With grains 6-7 locked in association with client 108b and grains 3-5 locked in association with a different client, L-module sends a message to client 108b granting access to grains 6-7 and denying access to grains 3-5.

In step 307, client 108b completes its operations on grain 6-7 and L-module of storage array 102 receives an indication that client 108b has completed the operations on grains 6-7. With knowledge that the operations are complete, L-module of storage array 102 unlocks grains 6-7 by updating their respective fields in lock table 129. If desired, client 108b can at any time send additional requests for access to grains 3-5.

In example option 2, the example method moves from step 305 to step 308 where L-module of storage array 102 checks for the availability of grains 3-5 multiple times before denying access to grains 3-5. In step 305, L-module of storage array 102 determined that grains 3-5 are write locked in association with a different client. In step 308, L-module waits a period of time and checks the lock table again to determine whether grains 3-7 are write locked in association with a different client. If the grains are still write locked, then L-module may wait another period of time and check the lock table again to determine whether grains 3-7 are write locked in association with a different client. The number of checks and the period of time may be statically set by L-module, may be dynamically set by the requesting client, and/or may be dynamically set by L-module based on system parameters. Further, with each given check of the lock table, when any of the grains are determined to be unlocked, (e.g. grains 6-7), L-module may write lock those grains in association with client 108b and then wait the period of time and check again to determine whether any of grains 3-5 became unlocked in the interim. If in the interim, more, but not all of the grains became unlocked (e.g. 3-4), then L-module may lock those grains in association with client 108b and then wait the period of time and check again. L-module may grant access to the grains locked in association with client 108b as they become available, or alternatively, L-module may wait until all of the requested grains are locked in association with client 108b to grant client 108b access to the grains. In this example, after all the grains became available, client 108b was granted access to grains 3-7, step 309. In step 310, L-module receives an indication that client 108b's operations on grains 3-7 are complete. In response, L-module updates the locking table to unlock grains 3-7.

In an example embodiment of step 308, L-module employs a time out. If in step 308, after L-module checks the locking table a threshold number of times or a for a threshold amount of time, step 308 times out. The time out threshold may be a static threshold set by storage array 102 or client 108b or may be a dynamic threshold set by storage array 102 based on storage array parameters or dynamically set by the client based on client parameters. If the threshold is met thereby causing the time out to occur, L-module may go to step 306 (as described above wherein a partial grant is issued) or alternatively may go to step 312 (as described below wherein the entire request is denied).

In example option 3, the example method moves from step 305 to step 312 where L-module denies access to all of the requested grains. In step 305, L-module of storage array 102 determined that grains 3-5 are write locked in association with a different client (e.g. client 108a) and that grains 6-7 are unlocked. In this option, L-module may deny the entire request thereby denying access to all the requested grains.

Figure 4:
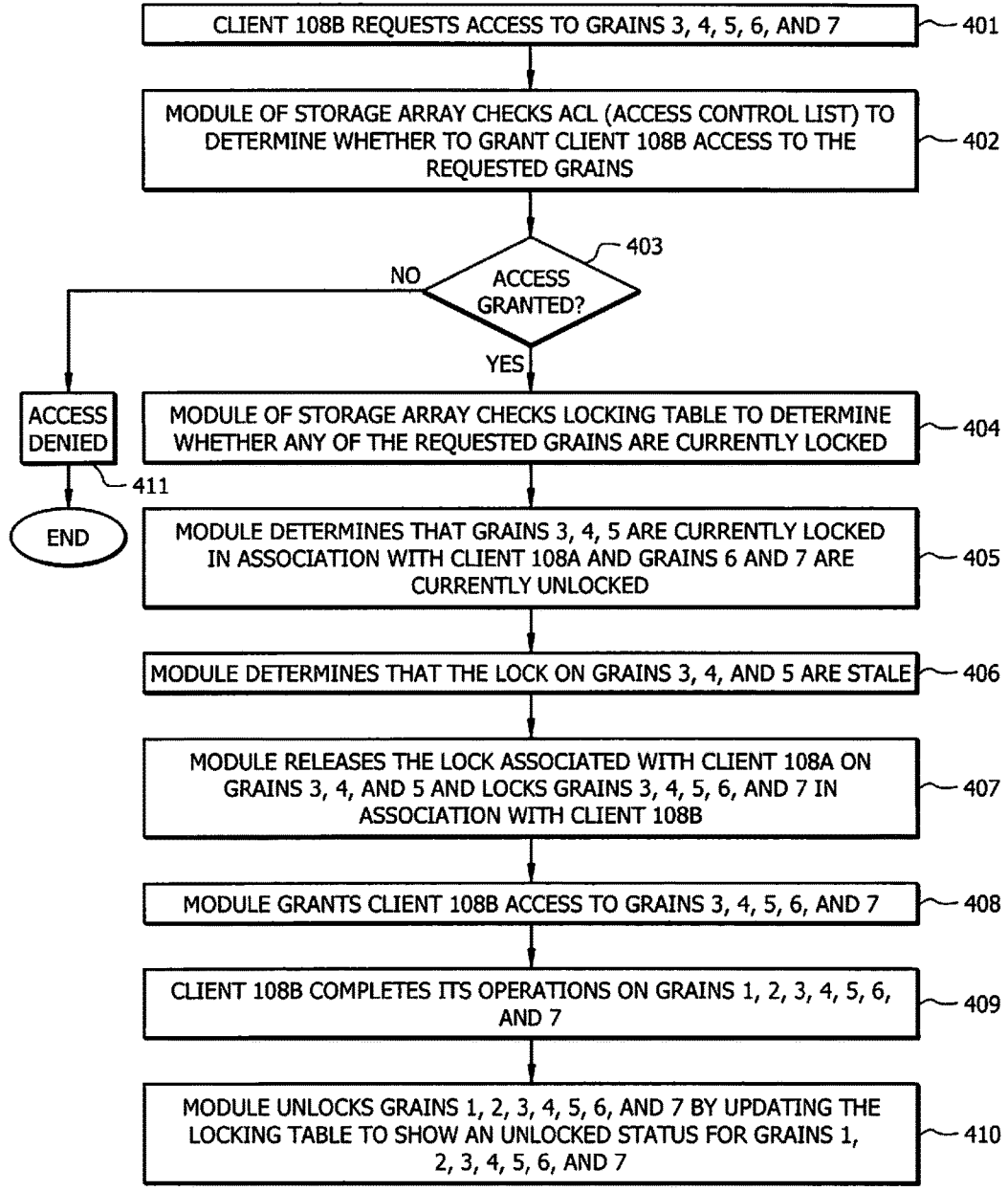
FIG. 4 illustrates an example dealing with stale write locks.

FIG. 4 illustrates an example where the storage array determines that write locks on requested grains are stale. A write lock may be considered stale if the lock has been in place for too long of a period of time or if the lock is in place after the client associated with the lock is no longer operating on the grain. In embodiments, a storage array may compare the time stamp (in the lock table) associated with a locked grain to determine how long the grain has been locked. The storage array can compare the period of time that the grain has been locked against a threshold value, wherein if the period of time is larger than the threshold value, the write lock is considered stale. The threshold value may be set by the storage array or the client. The threshold value may be static or dynamically set. A dynamically set threshold value may be based on system requirements, user preferences, and/or system parameters (e.g. current traffic flow, the current number of write locks in place, the time of day, the day of the year, etc.).

A write lock may become stale for a variety of reasons. In some cases, the client associated with the write lock may have indicated that it completed its operations on the grain, but for some reason the storage array is unaware that operations are complete, and thus, did not release the write lock on the grain. In another example, the client associated with the write lock may have gone offline or otherwise become noncommunicative after the write lock was placed on the grain. Regardless of the reason the write lock became stale, the storage array may want to release a stale write lock, such that other clients have an opportunity to access the grain if desired.

In step 401 of the example shown in FIG. 4, client 108b sends a request to storage array 102 requesting access to grains 3, 4, 5, 6, and 7. In step 402, storage array 102 checks the ACL (access control list) to determine whether client 108b should be permitted access the data stored therein. If client 108b is not listed as having access to storage array 102, then in step 411, access is denied, an error message is sent to client 108b, and the task ends.

If however, in step 403, the storage array determines that client 108b is listed as authorized to access storage array 102, then client 108b is granted access to storage array 102. In step 404, storage array 102 identifies which grains are requested in the received request and determines whether or not the requested grains are locked. In determining whether the requested grains are locked, storage array 102 checks the data entries in lock table 129 for each requested grain. In this example, when checking the data entries for each requested grain, storage array 102 determines that grains 3-5 are write locked in association with client 108a and grains 6-7 are currently unlocked (step 405).

In step 406, storage array 102 determines that the write locks are stale using the time stamp associated with each grain, as described above. In step 407, upon determining the write locks are stale, storage array releases the stale write locks on grains 3-5 and write locks grains 3-7 in association with client 108b by updating the lock table. Now that the grains are write locked in association with client 108b, in step 408, storage array 102 grants client 108b access to grains 3-7. While client 108b has access to the grains, client 108b is free to perform operations (e.g. read, write, and/or other manipulations) on the grains. Upon determining that client 108b has completed its operations on grains 3-7 (in step 409), storage array 102 unlocks the grains by updating the grains data entries in the lock table to show that the grains are unlocked (step 410).

In embodiment, storage arrays may periodically update the lock table to remove stale write locks even before a client requests access to the grains which have stale write locks. The periodic updates may occur at set times or may occur when storage array determines that the current network traffic flow is below a certain level and/or above a certain level. Further, in embodiments, after a grain's write lock associated with a client (e.g. client 108a) is determined to be stale, storage array 102 will prevent that client (e.g. 108a) from writing data to that grain.

Figure 5:
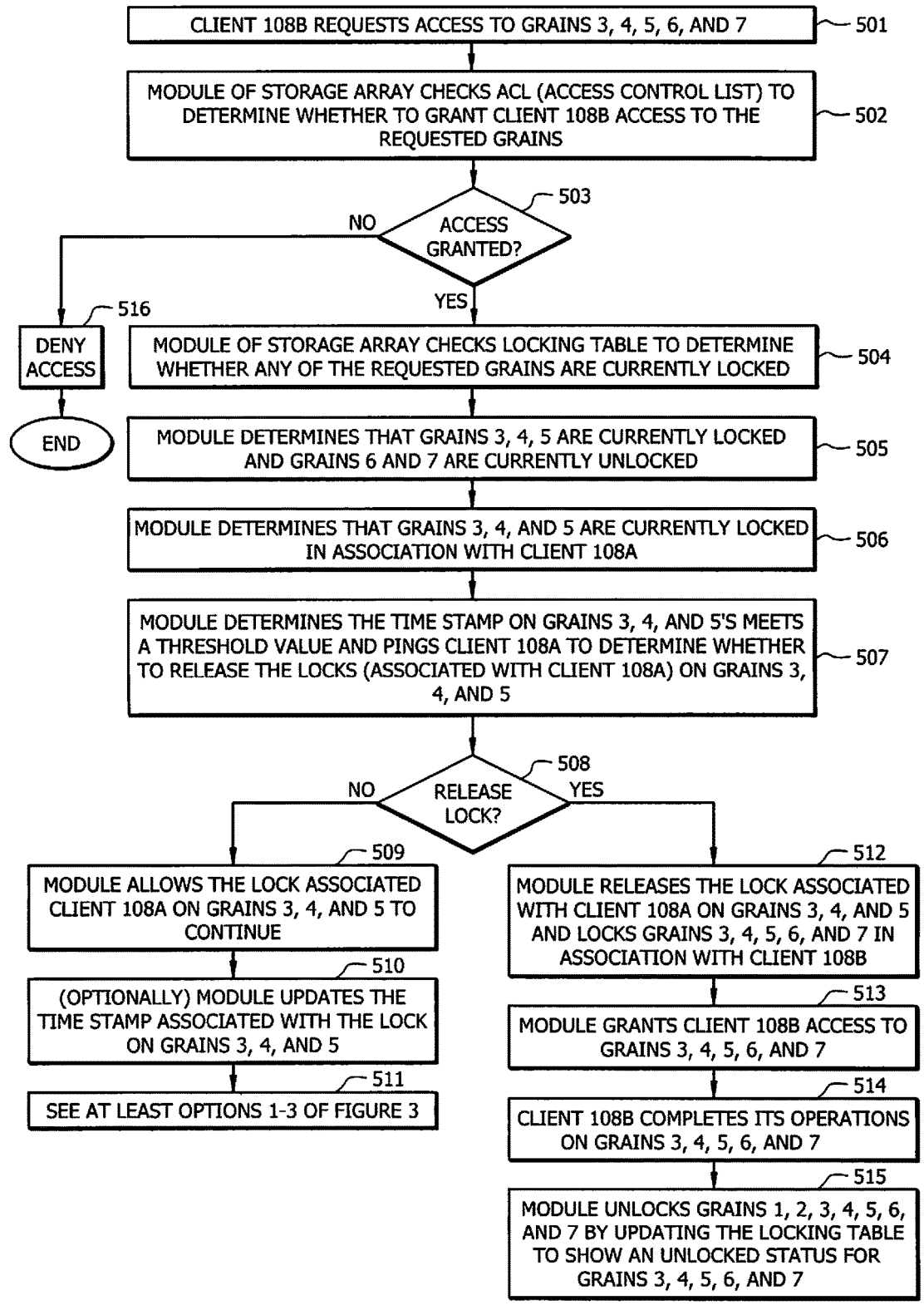
FIG. 5 is another example method of storage array side write locking.

FIG. 5 illustrates an example wherein the storage array determines that write locks on requested grains may be stale but may take additional step before unlocking the grains. In step 501, client 108b sends a request to storage array 102 requesting access to grains 3, 4, 5, 6, and 7. In step 502, the storage array 102 checks the ACL (access control list) to determine whether client 108b should be permitted access to storage array 102. If client 108b is not listed as having access to storage array 102, then in step 516, access is denied, an error message is sent to client 108b, and the task ends.

If however, in step 503, the storage array determines that client 108b is listed as having access to storage array 102, then client 108b is granted access to storage array 102. In step 504, storage array 102 identifies which grains are requested in the received request and determines whether or not the requested grains are locked. In determining whether the requested grains are locked, storage array 102 checks the data entries in lock table 129 for each requested grain. In steps 505 and 506 of this example, when checking the data entries for each requested grain, storage array 102 (step 503) determines that grains 3-5 are write locked in association with client 108a and grains 6-7 are currently unlocked.

In step 507, storage array 102 determines that the write locks may be stale using the time stamp associated with each grain, as described above. Upon determining that the write locks might be stale, the storage array sends a query to the client associated with the currently write locked grains to determine whether the client is still performing operations on the grains, whether the client has gone offline, and/or whether the client has become noncommunicative, etc (step 507). Thus, in this example, L-module pings client 108a to determine the status of the grains which are write locked in association with client 108a (e.g. grains 3-5). In step 508, the system determines whether to release the write lock. In step 508, if the client associated with the potentially stale write lock responds to the query indicating that the client desires continued access to the grains, then the storage array maintains the write lock on the grains. In doing so, the storage array moves to step 509 where the storage array allows the write lock on grains 3-5 to continue. In optional step 510, the storage array may update the time stamp associated with grains 3-5.

Because grains 3-5 are write locked in association with another client, storage array may use any of options 1, 2, or 3 (of FIG. 3) to handle the request. Thus, in step 511, storage array 102 may use at least option 1 (steps 306-307), option 2 (steps 308-312), or option 3 (step 312) to prevent a write contention on grains 3-5.

If, however, in step 508 storage array receives a response from the client associated with the write lock indicating that the client is no longer using the grains or an indication that the client is offline or otherwise noncommunicative (e.g. the storage array receives no response to the query), then storage array 102 will move to step 512, wherein storage array 102 releases the stale write locks and locks grains 3-7 in association with client 108b by updating the lock table. Now that the grains are write locked in association with client 108b, in step 513 storage array 102 grants client 108b access to grains 3-7. While client 108b has access to the grains, client 108b is free to perform operations (e.g. read, write, and/or other manipulations) on the grains. Upon determining that client 108b has completed its operations on grains 3-7 (in step 514), storage array 102 moves to step 515 and unlocks the grains by updating the grains data entries in the lock table to show that the grains are unlocked.

In short, systems and methods of the present invention provide storage array side write locking. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, at one of a plurality of storage arrays, a request to access grains stored in one or more of the plurality of storage arrays from one of a plurality of clients;
determining, by the one of the plurality of storage arrays, from a lock table a lock status of each of the requested grains and an identification of which of the plurality of clients is associated with each of the requested grains with the lock status of locked;
managing, by the one of the plurality of storage arrays, access to each of the requested grains based on the determined lock status and the identification of which of the plurality of clients is associated with each of the requested grains with the lock status of locked;
locking, by the one of the plurality of storage arrays, in the lock table the grains to the client associated with the request when the determining indicates the lock status is unlocked; and
waiting a stored period of time and then repeating the determining and the managing for a stored number of attempts for grains which remain when the determining indicates the lock status is locked.

2. The method of claim 1 further comprising:
changing, by the one of the plurality of storage arrays the lock status of at least one of the grains from locked to unlocked based upon an event.

3. The method of claim 2 wherein the event is a determination that the one of the plurality of clients associated with the at least one of the grains with the lock status of locked has completed operations on the at least one of the grains.

4. The method of claim 2 wherein the event is based on a time stamp.

5. The method of claim 2 where the event is a determination that the one of the plurality of clients associated with the at least one of the grains with the lock status of locked has become noncommunicative.

6. A storage array device in a cluster of storage array devices, the storage array device comprising:
one or more processors;
a memory device coupled to the one or more processors which are configured to be capable of executing programmed instructions comprising and stored in the memory device to:
receive a request to access grains stored in one or more of the cluster of storage array devices from one of a plurality of clients;
determine from a lock table a lock status of each of the requested grains and an identification of which of the plurality of clients is associated with each of the requested grains with the lock status of locked;

manage access to each of the requested grains based on the determined lock status and the identification of which of the plurality of clients is associated with each of the requested grains with the lock status of locked;

lock in a lock table the grains to the client associated with the request when the determine indicates the lock status is unlocked; and wait a stored period of time and then repeating the determine the lock status and the manage access for a stored number of attempts for the grains which remain when the determine the lock status indicates the lock status is locked.

7. The device of claim 6 wherein the memory coupled to the one or more processors is further configured to be capable of executing programmed instructions comprising and stored in the memory to change the lock status of at least one of the grains from locked to unlocked based upon an event.

8. The device of claim 7 wherein the event is a determination that the one of the plurality of clients associated with the at least one of the grains with the lock status of locked has completed operations on the at least one of the grains.

9. The device of claim 7 wherein the event is based on a time stamp.

10. The device of claim 7 wherein the event is a determination that the one of the plurality of clients associated with the at least one of the grains with the lock status of locked has become noncommunicative.

11. A non-transitory, machine readable storage medium having stored thereon instructions for performing a method, comprising machine executable code which when executed by at least one machine, causes the machine to:

receive, at one of a plurality of storage arrays, a request to access grains stored in one or more of the plurality of storage arrays from one of a plurality of clients;

determine, by the one of the plurality of storage arrays, from a lock table a lock status of each of the requested grains and an identification of which of the plurality of clients is associated with each of the requested grains with the lock status of locked;

manage, by the one of the plurality of storage arrays, access to each of the requested grains based on the determined lock status and the identification of which of the plurality of clients is associated with each of the requested grains with the lock status of locked;

lock, by the one of the plurality of storage arrays, in the lock table the grains to the client associated with the request when the determining indicates the lock status is unlocked; and wait a stored period of time and then repeating the determining and the managing for a stored number of attempts for grains which remain when the determining indicates the lock status is locked.

12. The non-transitory storage medium of claim 11 wherein the machine executable code further causes the machine to:

change, by the one of the plurality of storage arrays the lock status of at least one of the grains from locked to unlocked based upon an event.

13. The non-transitory storage medium of claim 12 wherein the event is a determination that the one of the plurality of clients associated with the at least one of the grains with the lock status of locked has completed operations on the at least one of the grains.

14. The non-transitory storage medium of claim 12 wherein the event is based on a time stamp.

15. The non-transitory storage medium of claim 12 where the event is a determination that the one of the plurality of clients associated with the at least one of the grains with the lock status of locked has become noncommunicative.

* * * * *